Sept. 14, 1943. H. M. BISHOP 2,329,582
TREAD
Filed Nov. 2, 1942
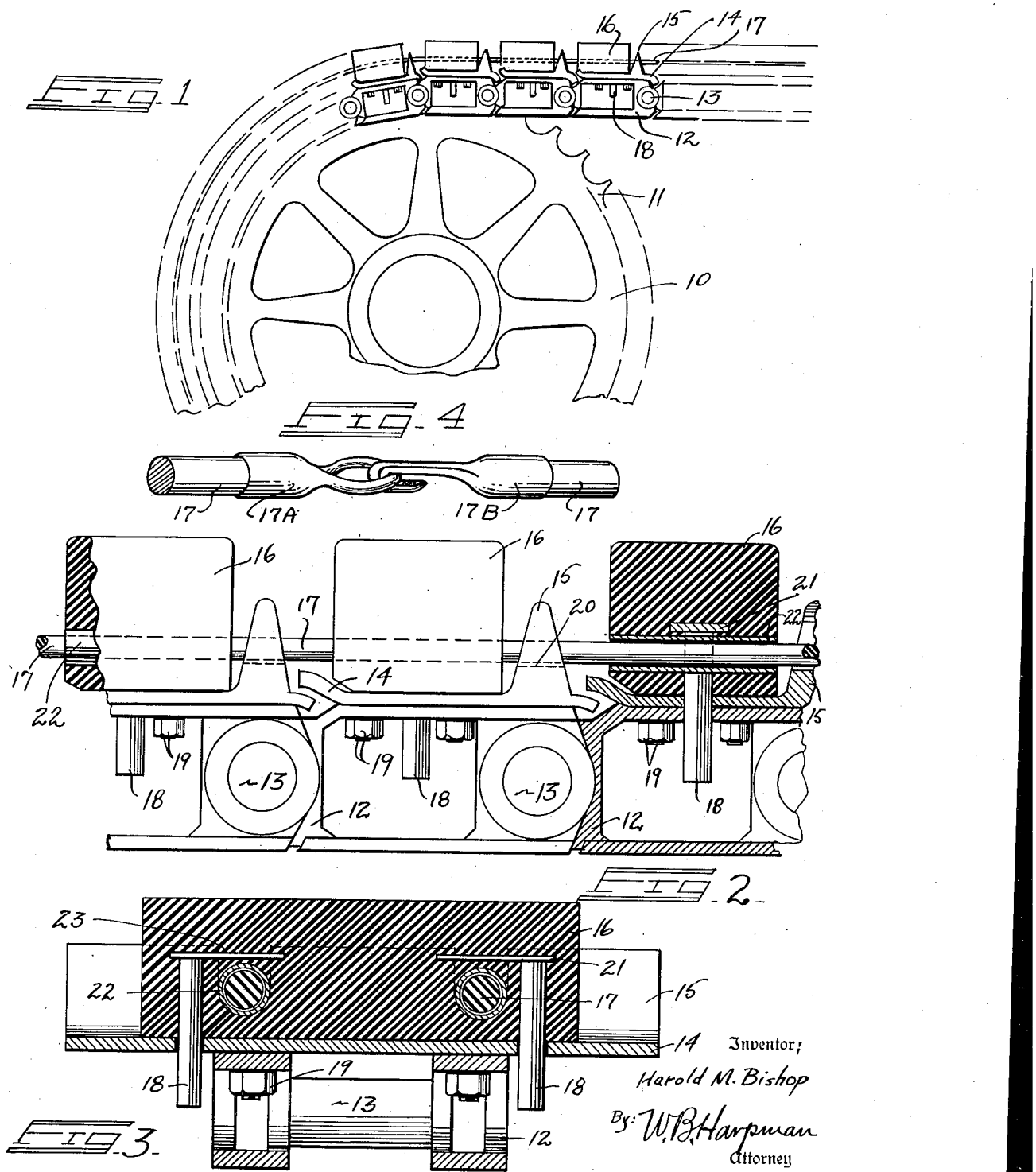
Inventor:
Harold M. Bishop
By: W.B.Harpman
Attorney Patented Sept. 14, 1943

2,329,582

UNITED STATES PATENT OFFICE 2,329,582

TREAD

Harold M. Bishop, Shreveport, La.

Application November 2, 1942, Serial No. 464,180

7 Claims. (Cl. 305—10)

This invention relates to treads and more particularly to an auxiliary tread assembly for continuous tread type tanks, tractors, half-tracks and other similar machines and vehicles.

The principal object of the invention is the provision of an assembly of auxiliary treads so designed that the same can be easily installed upon or removed from the lugged traction plates of a continuous tread equipped machine or vehicle so as to enable the same to travel on paved highways without the possibility of the regular metal treads damaging the highway during such travel.

A further object of the invention is the provision of a tread assembly capable of being quickly attached to or removed from the conventional continuous tread assembly of a tank or tractor or similar vehicle or machine, the tread assembly comprising a plurality of cushioning tread blocks of a height greater than the cleats commonly formed on the tread plates of the machine and adapted to be positioned on the tread plates of the machine by suitable cords formed of rubber or other elastic material, and dowel pins engaging portions of the said tread plates.

A still further object of the invention is the provision of a tread assembly which is simple in construction and thoroughly reliable and effective in operation.

The tread assembly shown and described herein has been designed to provide a readily installed, practical and convenient means of supplying a cushioning tread assembly for conventional metal continuous tread assemblies such as used on tanks and other military vehicles as well as on tractors and other domestic vehicles and machines. The device of the invention upon being installed on the continuous tread assembly of such a vehicle will remain securely in position due to its unique construction and may be installed thereupon in a matter of minutes which will permit the machine or vehicle so equipped to travel upon paved highways without damaging the same as would otherwise result if the vehicle or machine traveled upon the said highways on its conventional metal treads and cleats.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a side elevation of a continuous tread driving wheel with parts broken away with a portion of a continuous tread of conventional design in position thereon and illustrating the additional provision of the device of the invention on the conventional metal road engaging plates.

Figure 2 is a side elevation, parts of which are broken away and parts of which are in cross section, illustrating a portion of a continuous tread assembly equipped with the device of the invention.

Figure 3 is a cross sectional elevation of a portion of the device illustrated in Figure 2 and discloses the details of construction thereof.

Figure 4 is a perspective view of cable connection means used with the elastic cords of the invention.

By referring to the drawings and Figure 1 in particular, it will be seen that a conventional continuous tread assembly drive wheel is indicated by the numeral 10, the periphery of which is provided with a plurality of gear-like teeth 11 which teeth 11 are adapted to apply driving traction to a continuous tread assembly 12 which is of a conventional type and which in actual use is passed over at least one other wheel or wheel-like structure, and which in itself comprises an assembly of tread blocks pivoted to one another by means of pivot members 13, each tread block being supplied with a ground engaging tread plate 14 each of which in turn is provided with a transversely positioned cleat 15. A continuous interconnected chain of these assemblies pass over the wheel 10 of the device on which the continuous tread assembly is installed and form the conventional and heretofore known continuous tread assembly of the type well known in the art.

In Figure 1 this assembly is illustrated with the cleats 15 shown slightly higher in elevation than is ordinarily the case and with secondary treads 16 positioned one on each of the tread plates 14 and held in position thereon by two means, one of which comprises a pair of continuous elastic cords 17 each of which is passed through suitable openings in each of the secondary treads 16. The other means comprises a pair of dowel pins 18 which are passed through matching openings in the tread block assemblies 12 and which openings register with openings also provided in the tread plates 14.

By referring now to Figure 2 of the drawing, a side elevation with parts broken away and partly in cross section may be seen wherein the device of the invention as well as the individual tread blocks which comprise the complete continuous tread assembly are shown. The tread blocks 12 carry the tread plates 14 by means of a plurality of bolts and nuts generally indicated by the numeral 19 and the secondary treads 16, which with their attachment means comprise the device of the invention, are shown in position thereon. The dowel pins 18 are shown projecting through the tread plates 14 and the tread blocks 12 and the elastic cords 17 are shown passing through notches 20 in the cleats 15 as well as through the secondary treads 16.

A portion of the illustration of Figure 2 shows a cross sectional detail of the secondary treads 16, the dowel pin 18, a T-like head 21 formed thereon and tubular members 22 positioned through the openings in the secondary treads 16 and through which tubular members 22 the elastic cords 17 pass. It will thus be seen that when constructed in the manner illustrated and described, the secondary treads, preferably formed of rubber or similar cushioning material, and applied to the metal tread assemblies of a tank, tractor or similar vehicle so equipped, the result is the immediate provision of a suitable cushioning tread which will permit the machine or vehicle so equipped to operate on smooth surfaced, paved highways without damaging the same and with considerable assistance to the operation of the machine itself due to the termination of the loss of friction between the metal treads and the hard surfaced highway. It will be observed that the secondary tread assemblies are positioned on the tread plates only by means of the elastic cords 17 and the dowel pins 18 both of which permit the ready dismounting of the secondary treads within a relatively short time.

By referring to Figure 3 of the drawing, a cross sectional elevation taken in transverse relation to the elevation in Figure 2 may be seen, the dowel pins 18 being shown as being provided with elongated T-headed members 21 which being imbedded in the rubber of the secondary treads 16 serve to insure the accurate location of each of the secondary tread members 16 on the tread plates 14 of the conventional metal tread assembly. In Figure 3, the formation of the cleats 15 which comprise a portion of the tread plates 14 may be seen and the notches formed therein to permit the proper positioning of the elastic cables 17 are illustrated in dotted lines and generally indicated by the numeral 23. It will be observed that the conventional tread plates 14 are shown as being of greater width than the secondary cushioning treads 16 and the cross sectional elevation in Figure 3 clearly illustrates the ease in which the secondary tread assembly 16 may be removed from the tread plate 14 which it engages.

It is obvious that the device of the invention may be easily applied to the conventional metal tread assemblies of a vehicle or machine so equipped by simply unfastening suitable fasteners, such as hook and eye assemblies 17A and 17B in the elastic cables 17 and placing the secondary tread assembly in front of the continuous tread assembly and then driving the machine forward upon the assembly after which the ends may be manually engaged around and over the uppermost sections of the conventional continuous tread and the ends of the elastic cables fastened together. It is obvious that manual assistance is necessary in affixing the secondary treads as the dowel pins must register with the appropriate openings as the machine advances forward upon the device. An alternate form of attachment comprises the placement of the secondary tread in position upon the uppermost surface of the continuous tread assembly and the subsequent forward movement of the device, the dowel pins serving to hold the device in position as the machine advances on to the secondary tread assemblies. In removing the treads it is only necessary to unfasten the connection means of the elastic cables 17, which may be of any suitable design and formation, such as hook and eye assemblies 17A and 17B and drive the machine or vehicle forward, manually assisting the disengagement of the secondary treads from the rear-most sections of the machine as they rise from their contact with the surface over which they have been passing.

Having thus described my invention, what I claim is:

1. An auxiliary tread assembly for conventional continuous tread assemblies, said auxiliary assembly comprising a plurality of flexible cables and a plurality of resilient blocks having the cables threaded therethrough, dowel pins formed in each of the said blocks and adapted to register with openings formed in the conventional tread assemblies with which the auxiliary tread assembly is adapted to be used.

2. An auxiliary tread assembly for conventional continuous tread assemblies, said auxiliary assembly comprising a plurality of blocks of rubber, a plurality of flexible cables threaded through the said blocks and adapted to form an endless chain, means formed in and protruding from the said rubber blocks for locating the same with respect to the conventional tread assemblies and detachable fastener means for connecting the said flexible cable ends together.

3. An auxiliary tread assembly for conventional continuous treads, said auxiliary assembly comprising a plurality of flexible cables, a plurality of rubber blocks having the cables threaded therethrough, dowel pins positioned in each of the said blocks and adapted to register with openings formed in the conventional tread assemblies and detachable fastener means for connecting the said flexible cable ends together.

4. An auxiliary cushion tread assembly for continuous metallic tread assemblies, the said auxiliary cushion tread assemblies comprising a plurality of suitable rubber blocks adapted to be positioned on the tread plates of the said conventional tread assemblies, means for retaining the said rubber blocks in position on the said continuous tread assemblies, said means comprising a plurality of flexible cables threadably engaging each of the said rubber blocks, secondary means for insuring the positioning of the said rubber blocks on the tread assemblies, the said secondary means comprising a plurality of dowel pins attached to the said rubber blocks and adapted to register with suitable openings formed in the said conventional tread assemblies.

5. The combination of a conventional continuous tread assembly including surface engaging plates having cleats transversely formed thereon, notches formed in the said cleats, and a plurality of secondary cushion tread blocks adapted to be positioned one on each of the said tread plates of the conventional continuous tread assembly, means for affixing the said cushion tread blocks to the said conventional continuous tread assembly, the said means comprising flexible cables threadably positioned through the said cushion tread blocks and the said notches, secondary means for positioning the said cushion tread blocks on the said tread plates comprising dowel pins partly imbedded in the said cushion tread blocks and adapted to engage registering openings formed in the said conventional continuous tread assembly.

6. The combination of a conventional tread assembly including surface engaging plates having cleats transversely formed thereon, openings formed in the said cleats, and a plurality of secondary cushion tread blocks adapted to be positioned one on each of the said tread plates of the conventional tread assembly, means for affixing the said cushion tread blocks to the said conventional tread assembly, the said means comprising flexible cables threadably positioned through the said cushion tread blocks and the said cleat openings, secondary means for positioning the said cushion tread blocks on the said tread plates comprising dowel pins partly imbedded in the said cushion tread blocks and adapted to engage registering openings formed in the said conventional tread assembly, and detachable fastener means for connecting the said flexible cable ends together.

7. A device of the character described comprising a plurality of rubber cables and a plurality of blocks having the rubber cables threaded therethrough, means on the said blocks for positioning the blocks on the tread plates of a tread assembly, fastener means for connecting the cable ends together, the said rubber cables adapted to hold the said blocks on the said tread assemblies.

HAROLD M. BISHOP.